United States Patent [19]

Kreitmeier

[11] Patent Number: 4,631,913
[45] Date of Patent: Dec. 30, 1986

[54] AIR STORAGE GAS TURBINE

[75] Inventor: Franz Kreitmeier, Baden, Switzerland

[73] Assignee: BBC Brown, Boveri & Company, Limited, Baden, Switzerland

[21] Appl. No.: 738,787

[22] Filed: May 29, 1985

[30] Foreign Application Priority Data

Jun. 30, 1984 [DE] Fed. Rep. of Germany ....... 3424141

[51] Int. Cl.⁴ .............................................. F02C 1/00
[52] U.S. Cl. ......................................... 60/727; 60/760
[58] Field of Search ................. 60/760, 752, 751, 727, 60/39.511, 39.161

[56] References Cited

U.S. PATENT DOCUMENTS

| | | | |
|---|---|---|---|
| 3,228,190 | 1/1966 | Brown | 60/751 |
| 4,033,114 | 7/1977 | Zaugg | 60/39.02 |
| 4,090,360 | 5/1978 | Erismann | 60/39.29 |
| 4,117,343 | 9/1978 | Hoffeins | 290/52 |
| 4,339,925 | 7/1982 | Eggmann et al. | 60/760 |

FOREIGN PATENT DOCUMENTS 1078374 3/1960 Fed. Rep. of Germany ..... 60/39.51

Primary Examiner—Louis J. Casaregola
Assistant Examiner—Donald E. Stout
Attorney, Agent, or Firm—Burns, Doane, Swecker & Mathis

[57] ABSTRACT

An air storage gas turbine having a turbine, a combustion chamber supported on the external casing of the turbine and a hot gas casing leading from the combustion chamber to the blading. The hot gas casing is surrounded by an intermediate space. An inlet casing emerging into the intermediate space is provided with main air supply lines, in each of which is located at least one control device and one rapid shut-down device. The inlet casing forms an annular chamber and is provided with radial supply openings, a vertical outlet opening and axial outlet openings. A blow-out passage communicates the vertical outlet opening with a blow-out valve.

5 Claims, 2 Drawing Figures

AIR STORAGE GAS TURBINE

FIELD OF INVENTION

The present invention relates to air storage gas turbines. Generally, and more particularly to air storage gas turbines having an arrangement for effecting rapid shut-downs with minimal overspeeding of the turbine.

BACKGROUND OF THE INVENTION

In air storage gas turbines, the air inlet casing is generally located above the turbine and underneath the upright combustion chamber. It is therefore necessary to provide a straightener with a relatively small opening ratio in order to ensure that an even flow is provided to the combustion chamber. These straighteners however, cause pressure losses. In addition, part of the main air must be supplied to the intermediate space in order to cool the hot gas casing. This known construction leads, furthermore, to long supply lines between the inlet casing and shut-off devices because the latter are normally supported on the foundations of the turbine installations. The result is a relatively large storage volume in the main air region. This large volume can adversely affect the rapid shut-down behaviour of the installation and lead to a large overspeed when the load is shed.

OBJECT AND SUMMARY OF THE PRESENT INVENTION

An object of the present invention is to provide an inlet casing in an air storage gas turbine, which inlet casing, on the one hand, causes a low pressure loss while providing even inlet flow to the combustion chamber and, on the other hand, ensures even cooling of the hot gas casing, without a direct adverse effect on the flow.

The present invention achieves this object and others by providing an inlet casing which forms an annular chamber, whose inner periphery surrounds the vane carrier, whose major part of its outer periphery is adjacent to the outer casing. It is provided with at least one radially directed inlet opening for receiving the main air, which inlet opening is located in the lower half annulus, of the inlet casing and at least one axial outlet opening communicating the annular chamber with an intermediate chamber formed by the outer casing of the air storage gas turbine.

An important advantage of the invention is that the main air supply line and a blowdown line are arranged for rapid shut-down also, these lines are situated at the lower part of the turbine which arrangement facilitates the, assembly and dismantling of the combustion chamber and the upper part of the turbine.

A preferred embodiment of the present invention is shown diagrammatically in the drawing, wherein:

FIG. 1 is a partial longitudinal section through an air storage gas turbine; and FIG. 2 is a cross-section through the air inlet casing along the line II—II in FIG. 3.

Only those parts of the installation important to an understanding of the invention are shown.

DETAILED DESCRIPTION OF THE PREFERRED EMBODIMENT

Figure 1:
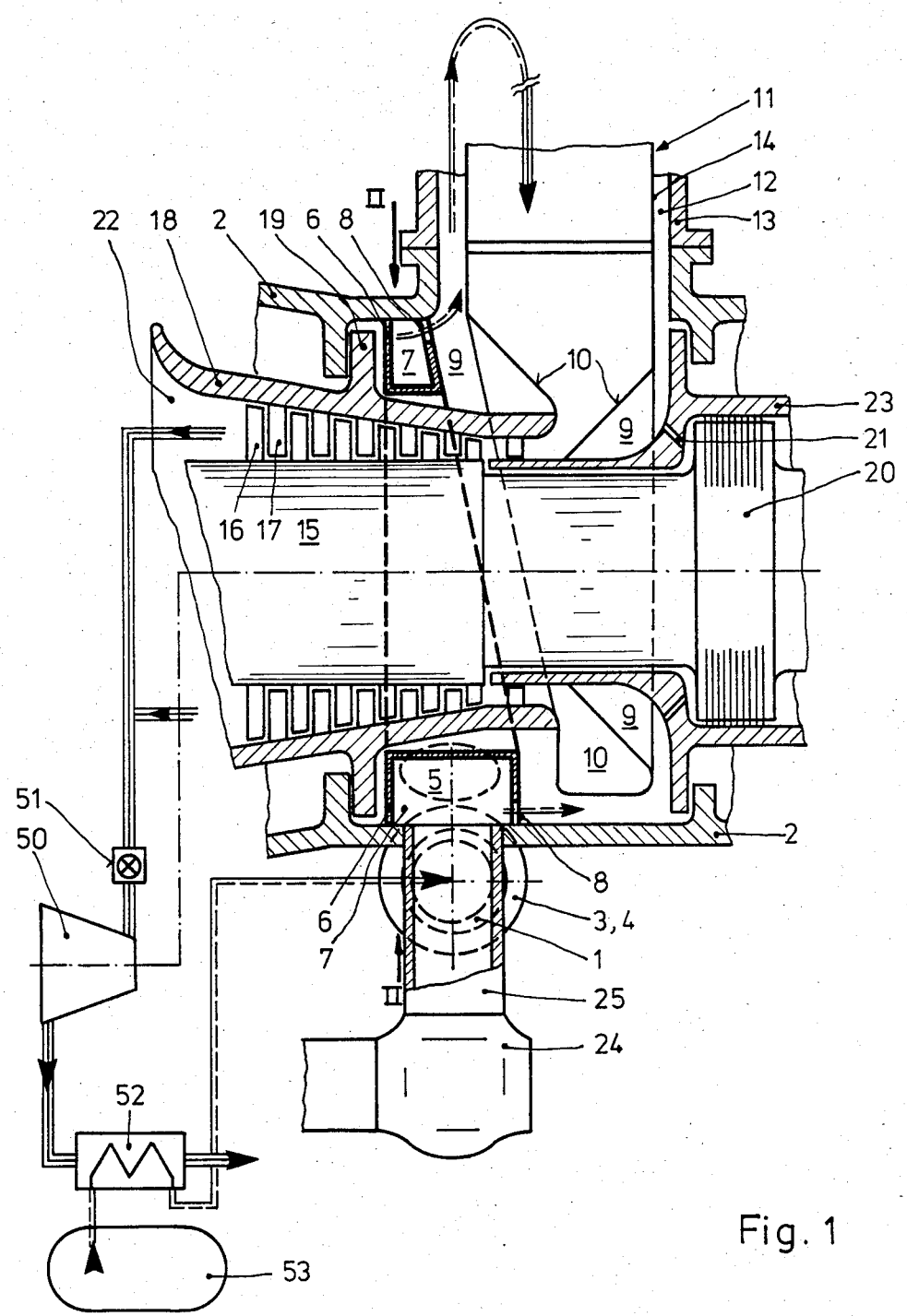

As indicated diagrammatically in FIG. 1, a low pressure partial turbine 50 with a separate combustion chamber 51 generally follows the high pressure part, a common shaft being provided for the two partial turbines. The exhaust gases of the low pressure partial turbine give up their residual heat in a recuperator 52, through the air side of which flows the medium taken from the storage facility 53.

Figure 2:
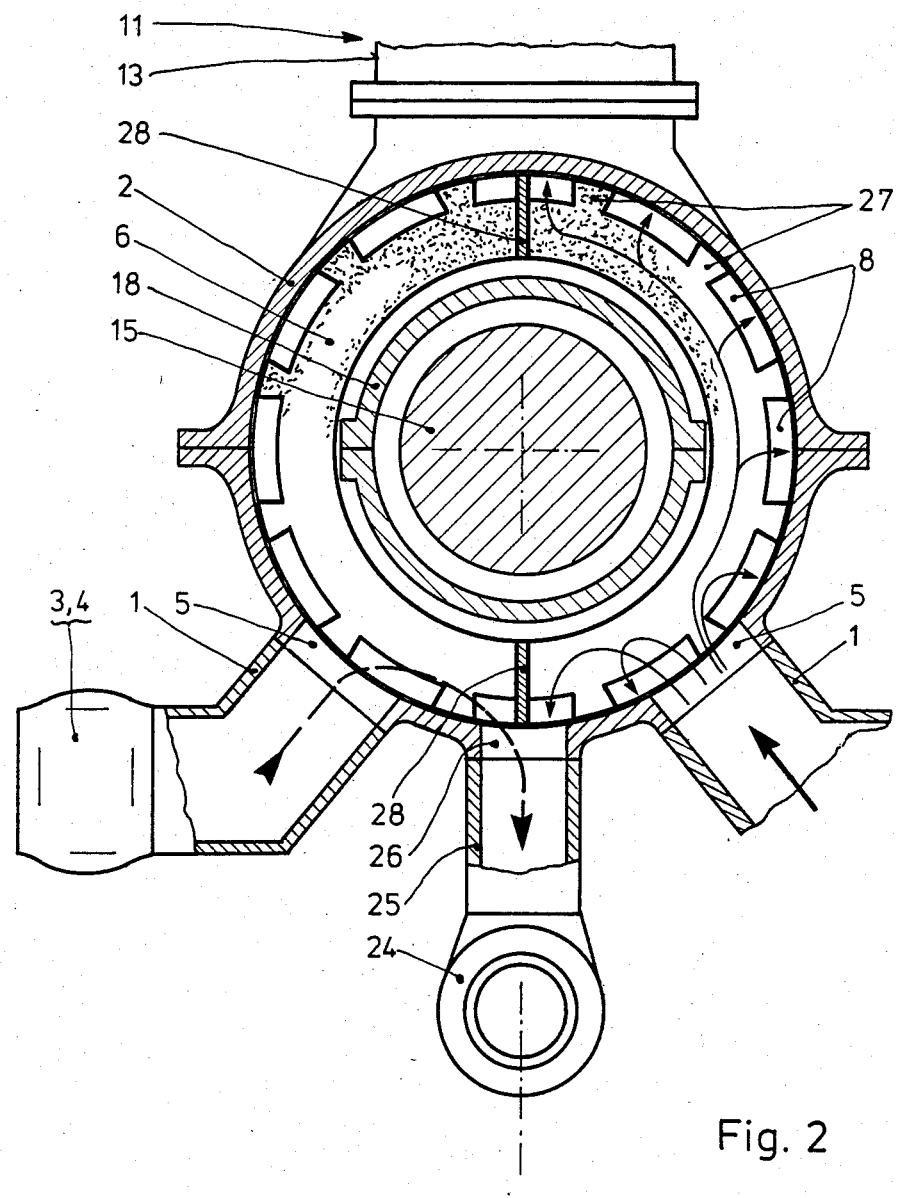

Referring to FIGS. 1 and 2, the air preheated in this manner passes via two main air supply lines 1 located on each side of the machine to the lower part of the horizontally split external casing 2 of the high pressure turbine. One rapid shut-down valve 3 and one control valve 4 are located in each of the supply lines 1, directly before they enter the external casing 2.

The air flows via inlet openings 5 into an inlet casing 6. It is distributed in an annular space 7 and enters the intermediate space 9 through axially directed outlet openings 8. The air therefore flows over and cools the external wall of the hot gas casing 10. The air is led from the intermediate space into the combustion chamber 11, only partially shown, on the upper part of the external casing 2. It flows through the annular duct 12 between the external casing 13 and the internal casing 14 and is distributed, in a manner not shown, to the burner, the combustion chamber firebricks and the mixing nozzles.

Having been heated, the combustion gases pass via the hot gas casing 10 into the high pressure turbine, which consists essentially of a rotor 15 fitted with rotor blades 16 and a stator 18 provided with guide vanes 17. The rotor 15 rotates in bearings, which are not shown, and the stator 18 is suspended by means of a support flange 19 in the external casing 2. A balance piston 20 is provided for thrust balance purposes at the shaft end and the balance piston's leakage air is supplied via holes 21 from the intermediate space 9. These holes or other suitable openings are located in a single part or multipart internal casing 23 which surrounds the parts of the rotor which are not bladed and which is carried in the external casing 2.

After partially giving up their energy to the rotor 15, the gases which have expanded in the blading (16, 17) flow via a diffuser 22 into the combustion chamber 51 of the low pressure turbine 50.

A blow-down valve 24 is provided in the immediate vicinity of the machine for the case of a rapid shut-down. It is located in a blow-down line 25 which branches off from an outlet opening 26 (FIG. 2) in the inlet casing 6 and is fixed to the external casing 2. The outlet opening 26 and the blow-down line 25 have vertical axes and are each applied at the lowest point of their corresponding casings 6 and 2.

This arrangement, together with the very short line length from the rapid shut-down valve 3 to the inlet casing 6, provides a very small storage volume. This guarantees a small overspeed after a rapid shut-down and the load shedding control techniques involved are easily manageable.

The effects quoted, in particular the good rapid shut-down behaviour and the cooling of the hot gas casing 10, are due to the special configuration of the inlet casing 6. It has an annular shape and is located in the intermediate space 9 between the hot gas casing 10 and the suspension of the stator 18, the support flange 19 in the present case. The inner wall of the inlet casing annulus surrounds the stator 18. The outer wall is adjacent to the external casing 2. From the inlet openings 5 to the most distantly located of the outlet opening 8, the casing 6 has a preferably steadily decreasing flow cross-section and this gives it a trapezoidal shape in longitudinal section. The oblique wall provided with the axially directed outlet openings 8 runs approximately parallel to the boundary of the hot gas casing 10 which provides optimum space utilisation and even flow to the casing 10.

FIG. 2 shows the fitted inlet casing 6 from the direction of the support flange 19. To make it easier to understand, a cross-section is along the line II—II in FIG. 1. The same parts have the same reference signs as in FIG. 1.

The control and rapid shut-down valves 3 and 4, are respectively located in the horizontal branch of the main air supply lines 1. The entry of the latter in the inlet casing 6 takes place in the radial direction towards the axis of the machine in the inlet openings 5. The end portions of the lines 1 run correspondingly in a radial direction, in fact at an angle of approximately 50° to the horizontal. This angle can, of course, be freely selected; it is, inter alia, a function of the given space relationships. It may be seen that pipework fitted with compensators for dealing with expansions is not necessary because the valves 3 and 4 are in direct connection with the inlet casing 6.

The outlet openings 8, separated from one another by the protusions 27, are evenly distributed around the periphery at the outer edge of the inlet casing 6. In order effectively to prevent aerodynamic coupling and hence vibrations between the two main air supply lines 1, two separating ribs 28 are fitted in the annular chamber 7. Since they extend over the complete height of the annular space 7 and over its axial extension, they divide the inlet casing 6 into a right-hand and a left-hand chamber. Flow conditions, such as are shown by the full line arrows in the right-hand half of the figure, appear.

In the case of a rapid shut-down, the main air is blown down via the blow-down valve 24, as indicated by the dotted arrow in the left-hand half of the figure. Apart from the very short and direct paths, it may be seen that an advantage arises because the hot gas casing 10 is very well screened and is hardly affected by this action.

It is to be understood that the present invention may be embodied in other specific forms without departing from the spirit or essential characteristics of the present invention. The preferred embodiment is therefore to be considered illustrative and not restrictive. The scope of the invention is indicated by the appended claims rather than by the foregoing descriptions and all changes or variations which fall within the meaning and range of the claims are therefore intended to be embraced therein.

What is claimed:

1. In an air storage gas turbine of the type including:
a turbine assembly including a bladed rotor, a vaned stator, a vane carrier casing from which the stator is suspended and a turbine inlet;
an outer casing disposed about said vane carrier casing and forming an intermediate space;
a combustion chamber supported by the external casing;
a hot gas duct means for communicating the combustion chamber with the turbine inlet, said hot gas duct means including a hot gas casing positioned substantially within the intermediate space so that the intermediate space substantially surrounds the hot gas casing; and
main air passage means for supplying air to said air storage gas turbine;
wherein the improvement comprises an inlet casing having upstream, downstream, and radially inner walls which are distinct from said outer casing and said vane carrier and forming an annular chamber in said intermediate space, said inlet casing having a lower half, an inner periphery and an outer periphery, said inner periphery surrounding the vane carrier casing, at least a major portion of said outer periphery being adjacent to the outer casing, said inlet casing communicated with said main air passage means through at least one radial inlet opening located in said lower half, said inlet casing having at least one axial outlet opening located at an outer circumferential edge of said annular chamber and communicating said annular chamber with the intermediate space, at least one control device and at least one rapid shut-down device provided at a location along said main air passage means.

2. The turbine according to claim 1, wherein the inlet casing has a radial outlet opening in said lower half, said turbine further comprising a blow-down valve and blow-down passage means for communicating said blow-down valve with said radial outlet opening, the control device, the rapid shut-down device and the blow-down valve located adjacent the outer casing of the inlet casing.

3. The turbine according to claim 2, wherein, the inlet casing has a continuously decreasing cross-section from the inlet opening to a most remote part of the inlet casing from the inlet opening.

4. The turbine according to claim 2, wherein axial partitions at locations within the inlet casing divide the inlet casing into two semi-annular chambers.

5. The turbine according to claim 2 wherein said radial outlet opening is directed vertically.

* * * * *